United States Patent [19]

Grenet

[11] Patent Number: 4,793,317
[45] Date of Patent: Dec. 27, 1988

[54] METHOD AND APPARATUS FOR LIQUEFYING PARAFFIN CRYSTALS INCLUDED IN FUEL

[75] Inventor: Edouard P. Grenet, Asnieres, France

[73] Assignee: INOTEC, Societe A Responsabilite Limitee, Ville d'Avray, France

[21] Appl. No.: 32,767

[22] Filed: Mar. 31, 1987

[30] Foreign Application Priority Data

Apr. 7, 1986 [FR] France ................... 86 04917

[51] Int. Cl.⁴ ............................................. F02M 31/12
[52] U.S. Cl. ...................................... 123/557; 123/549
[58] Field of Search ............... 123/546, 549, 557, 553; 219/499, 543, 548, 553

[56] References Cited

U.S. PATENT DOCUMENTS

| 2,782,289 | 2/1957 | Nathanson | 123/553 |
|---|---|---|---|
| 3,933,135 | 1/1976 | Zillman et al. | 123/549 |
| 4,280,452 | 7/1981 | Kawamura et al. | 219/499 |
| 4,473,054 | 9/1984 | Marcoux et al. | 123/557 |
| 4,501,255 | 2/1985 | Ploeg et al. | 123/557 |
| 4,539,108 | 9/1985 | Izutani et al. | 123/557 |
| 4,600,825 | 7/1986 | Blazejovsky | 123/549 |

FOREIGN PATENT DOCUMENTS 2058920 4/1981 United Kingdom .

Primary Examiner—Willis R. Wolfe
Assistant Examiner—M. Macy
Attorney, Agent, or Firm—Amster, Rothstein & Ebenstein

[57] ABSTRACT

The invention relates to a method and to apparatus for liquefying fuels for compression ignition engines and for heating installations, with the apparatus being designed to prevent filters becoming clogged with paraffin crystals and also to unclog such filters by projecting streamlines of very hot fuel (up to 70° C.) thereon. The apparatus comprises one or more electrical heater resistances (18) of the extra flat circuit type formed on an electrically-insulating support (17) and then coated with an electrically-insulating coating, said resistances being placed in one or more chambers (1) which are of small volume relative to the volume of the filter and which are situated immediately upstream from the filter elements. The apparatus is such that the fuel follows an approximately U-shaped path around the heater element. An electrical temperature sensor (19) is immersed in the flow of fuel. This sensor is a low current sensor and its resistance varies as a function of temperature. It is a semi-conductor having a positive or negative temperature coefficient, or a transistor, and it is connected to a temperature threshold-detection circuit constituted by a Wheatstone bridge followed by an analog comparator. The circuit is also provided with electrical protection means against mis-connections or current surges.

21 Claims, 2 Drawing Sheets

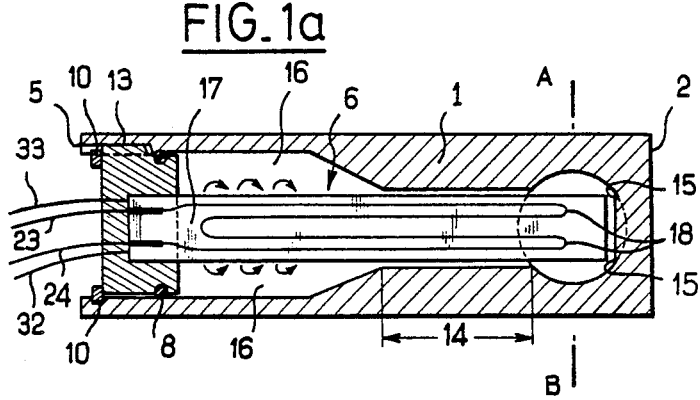
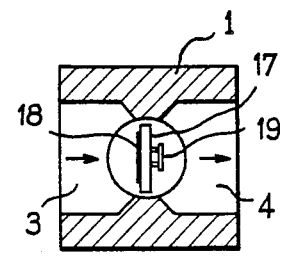
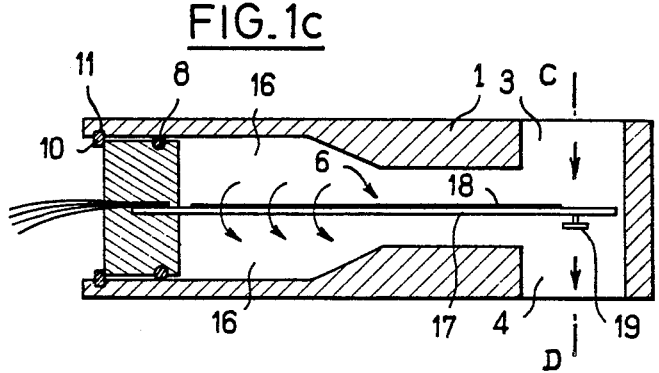
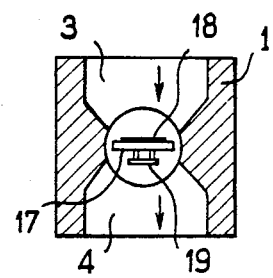

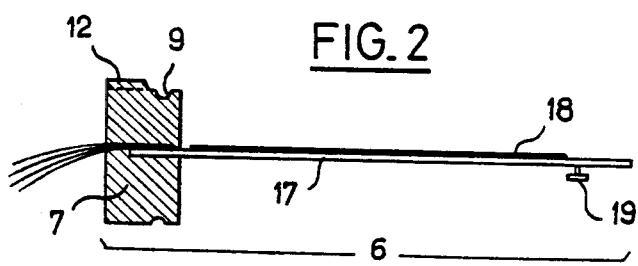
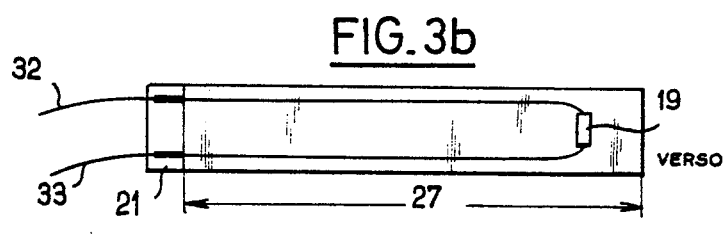

METHOD AND APPARATUS FOR LIQUEFYING PARAFFIN CRYSTALS INCLUDED IN FUEL

The present invention relates to apparatus for liquefying paraffin crystals included in diesel fuel or in light oil, which crystals precipitate on the outside surfaces of filter elements in compression ignition engines or in other installations, e.g. heating installations. The apparatus includes one or more electrical heater resistances which, in diesel-engined vehicles, are powered by the vehicle's battery or by its alternator.

BACKGROUND OF THE INVENTION

Crystallization phenomena in diesel fuels and in light oils are getting worse for two reasons:

(1) the mesh size of filter elements is becoming smaller and smaller, in the sixties it was about 30 microns, it has dropped over the years to about 10 microns and recently 5-micron meshes have become available; filters with a mesh of 2 microns may become available in the near future, and this will lead to filter elements clogging as soon as the fuel reaches its cloud point; and (2) there are increasing quantities of large paraffin molecules in diesel fuels and light oils in addition to the small paraffin molecules which have always existed therein. Small paraffin molecules contain only a few carbon atoms and precipitate at around 0° C. in the form of microcrystals which are 1 to 2 microns in size, this phenomenon is known as the "cloud" point. In very cold weather the microcrystals coagulate into lumps and then become treacly. Heretofore pumps have continued to be able to draw-in such fuel even at very low temperatures because of the sufficiently large pore size of the filters through which the fuel passes, i.e. about 5 microns. It is also important to observe that such small crystals remelt at a temperature only slightly higher than the temperature at which they appear.

Since the beginning of the oil crisis, the oil companies have been leaving an increasing quantity of large paraffin molecules in diesel fuels and light oils for reasons of refining economy. These large molecules respond quite differently to the cold. They remain supercooled for one or more weeks even in very cold weather. They can thus continue to be pumped together with lumps and treacly coagulations of smaller paraffin molecules as described above. However, they can be caused to crystallize rapidly, i.e. in a few minutes or even a few seconds as a result of a shock, for example the shock of being projected against a filter element. These large molecule crystals may be 80 to 200 microns in size. Worse, once they have appeared they are difficult to melt; at 25° C., 20% have melted; at 45° C. 80% have melted, and the remainder melt in the range 60° C. to 65° C. The greater the number of carbon atoms in a molecule, the higher its melting temperature.

Although numerous additives are always present and serve to modify various physical aspects of the unfavorable phenomena described above, they are by no means certain of avoiding the unwanted practical effect of filters becoming clogged.

Effective liquefying apparatus must therefore include a heating surface at close to 70° C. Unfortunately, in order to avoid loss of power and also engine damage, it is important to avoid heating diesel fuel or light oil to a temperature of greater than 40° C. (after the initial pre-heat period prior to starting the engine). Temperature regulation of the hot surface of the liquefying resistances must therefore be dissociated from temperature regulation of the overall flow of diesel fuel or light oil. It should also be observed, with respect to motor vehicles, that vehicles are not presently mass produced with a sufficiently powerful supply of electricity to be capable of raising the average temperature of the flow of fuel to above the melting point of large paraffin crystals. The term "liquefy" is being used in the present application to cover the melting of paraffin crystals rather than just keeping the temperature high enough to retard their crystallization.

SUMMARY OF THE INVENTION

In a first aspect, the present invention provides a method of liquefying fuels containing paraffins when, under the effect of cold temperatures, said paraffins obstruct the filter element of the filter (and also of the pre-filter if one exists) located in the feed circuit of a compression ignition engine or of a heating installation, there being a pump situated downstream from the filter to draw-in fuel from a tank, the method including the step of placing a heat source in a heating chamber located upstream from and close to said filter element with the fuel passing through said heating chamber, the method including the improvement whereby the heating chamber is of small volume compared with the volume of the filter or the pre-filter and includes a heat source regulated to a temperature of about 70° C., thereby initially injecting the small number of cubic centimeters of fuel contained in the heating chamber and heated to about 70° C. into the filter element when the pump starts, and subsequently injecting into the filter element very hot streamlines of fuel included within a flow having an average temperature which remains less than 40° C. even though some of said streamlines are at a temperature close to 70° C., said heat source having a large contact area with the fuel, said area being electrically insulated for safety reasons and having a uniform temperature, and the flow of fuel through the heating chamber when the pump is in operation being directed around the heat source in such a manner as to ensure a long period of contact and a high degree of heat exchange between the heat source and the fuel, with turbulent flow being set up in the fuel, thereby setting up instantaneous temperature differences within the volume of its flow and as a function of time, thus providing intermittent streamlines or jets of fuel at the outlet from the heating chamber at temperature close to the surface temperature of the heat source.

This goes against the teaching of prior patent specifications in which the heater element is situated in a chamber of relatively large volume (U.S. Pat. No. 4,091,265, filed Aug. 6, 1975 and European Pat. No. 0 155 839, filed Mar. 18, 1985), or in which the temperature regulation system is determined by the very nature of the heater element and switches off the electrical power supply at a temperature which is too low to melt crystals of large paraffins. For example, a positive temperature coefficient device may be used as a heater element, e.g. a power transistor optionally fitted with a finned heat sink. Such heater elements are described in U.S. Pat. No. 4,091,265 filed Aug. 6, 1975, British Pat. No. 2 483 013 filed May 20, 1980, and European Pat. No. 0 051 936 filed Oct. 20, 1981.

In the present invention, the ratio between the volume of the heating chamber and the volume of the filter lies in the range about 1/10 to 1/20.

In another aspect the present invention also provides apparatus for liquefying fuels containing paraffins by implementing the method of claim 1, the apparatus comprising a heating chamber including a heat source, said chamber being suitable for having the fuel pass therethrough and being disposed upstream from and in the vicinity of the filter element of the filter (and of the pre-filter if one exists) located in the feed circuit of said engine or of said heating installation, the apparatus including the improvements whereby the heating chamber is of small volume relative to the volume of the filter (or of the pre-filter), whereby the heat source is constituted by at least one electrical heater resistance in the form of an extra flat circuit on a rigid support plate, whereby temperature-regulating means are associated with the heat source to prevent the temperature of the fuel from rising to more than about 70° C., and wherein the heat source is protected from direct contact with the fuel by an electrically-insulating coating.

The support plate is made of an electrically non-conductive material (alumina, epoxy resin, enamelled sheet, pre-oxidized metal, etc.). The extra flat circuit may be obtained by depositing metal using a silk-screen process, or a decal or transfer process, or by projection. The electrically insulating coating may be glass, projected resin, or an oxidized layer of the metal constituting the resistance.

The heating chamber may either be an independent heater body placed immediately upstream from the inlet to the filter and/or the pre-filter if one exists, or it may be an intermediate element placed between the head of the filter and/or of the pre-filter and the corresponding filter element (a filter cartridge), or else it may also be integrally moulded or machined in the inlet circuit for admitting fuel into the head of the filter and/or of the pre-filter, as the case may be.

In general, the term "filter" as employed in the present description should be considered as covering both filters per se and pre-filters.

The present invention makes use, inter alia, of printed circuits to constitute the heat source. The circuit is formed on a support plate having a thickness of approximately 1 to 2 millimeters and made of an electrically-insulating material, as mentioned above, with a metal circuit of palladium-silver or platinum-silver or the like deposited on one of the faces thereof by silk-screen printing or by vacuum projection, for example. The plate is a rectangle of about 15 mm×100 mm and the electrical resistance may be of various different shapes: e.g. an elongate U-shape; an elongate W-shape having rounded corners, thereby increasing the developed length of the resistance on the plate of small size; or any other pattern suitable for ensuring that the electrical power dissipated by the resistance is properly spread over the area of the plate. The electrical resistance and the area of the plate are chosen so that the average power of the heater element does not exceed 10 watts/cm$^2$±5% on either face. This power per square centimeter is chosen so that the surface temperature of the resistance does not exceed 70° C. ±5% when the heater element is immersed in a flow of diesel fuel or light oil having a temperature of not more than 15° C. at the inlet to the apparatus, with said flow corresponding to the normally expected flow for any particular diesel engine, given its power.

The heater plate is disposed vertically in the heating chamber and the shape of the plate and the chamber are such as to cause the fuel to flow along a U-shaped path so that the fuel runs over the surface of both faces of the plate, thereby maximizing the contact time between the diesel fuel or the light oil and the heater element (thus providing a very high heat exchange coefficient). The fuel flow leaving the heating chamber is turbulent so that there is a very wide range of temperatures in the instantaneous flow throughout its volume and also in time. Thus, if the heating chamber is situated very close to the filter element, the filter element is struck by streamlines or jets having a very wide range of temperatures, at least some of which exceed the melting point of the heaviest paraffins, thereby washing the filter surfaces (at least intermittently), by melting even the most difficult of crystals.

Such a printed circuit resistance (i.e. generally an extra flat resistance) also has the advantage of the heat exchange surface rising very quickly in temperature, and much quicker than would a rod-shaped heater element. In addition, its thermal inertia is less which also helps to reduce the pre-heat period when starting.

In order to regulate the temperature of the flow of diesel fuel or light oil, a temperature probe or sensor is installed at a suitable distance from the heater circuit to be little influenced thereby and on the side of the plate where the fuel leaves the heating chamber, in order to measure the outlet temperature of the fuel. The probe may be of the negative temperature coefficient type, and it is preferably selected from semi-conductors operating at a low current. Depending on its type, the probe may either be fixed to the end of the heater element support close to the exit of the fuel from the heating chamber, or else it may be fixed on an independent support likewise placed in the flow of fuel leaving the heating chamber. The resistance of the probe varies with temperature and it may be of positive or negative temperature coefficient, e.g. a positive temperature coefficient silicon sensor, or a transistor.

The temperature probe and its power supply circuit are electrically-insulated by any appropriate means in order to ensure that the electrical components in the heating chamber are adequately isolated from the diesel fuel or the light oil in which they are immersed, this being most important from the safety point of view and absolutely essential if the apparatus is used with vehicles that transport dangerous substances or with installations that operate in explosive atmospheres. Such insulation avoids the drawback of having bare electrical contacts immersed in fuel or oil which may become partially conductive due to the presence of humidity and as described in some prior patent specifications (e.g. the above-specified European Pat. Nos. 0 051 936 and 0 155 839).

The temperature probe is connected to a transistorized bridge which operates a relay controlling the power supply to the heater resistance in response to a relay-operating current of 80 to 160 milliamps. The temperature to which the flow of diesel fuel or light oil is regulated is either in the range 65° C. to 70° C. or else in the range 35° C. to 40° C., depending on whether the apparatus is connected to a second or external temperature probe which serves to switch on the apparatus only when the outside temperature or the temperature of the flow of diesel fuel or light oil upstream from the device is not already more than 10° C. This external probe may either be an electronic device similar to that used for regulating the temperature of the resistance, or else it may be a temperature-sensitive switch including a snap-action membrane designed to switch on at a temperature of 5° C. and to switch off at a temperature of 10° C. Such 5° C. of hysteresis is necessary to prevent relay hunting which would otherwise occur at temperatures in the vicinity of a common switch-on and switch-off temperature.

BRIEF DESCRIPTION OF THE DRAWINGS

An embodiment of the invention is described by way of example with reference to the accompanying drawings, in which:

FIG. 1a is a diagrammatic vertical section through a heating chamber in the apparatus;

FIG. 1b is a section on line A-B of FIG. 1a;

FIG. 1c is a diagrammatic horizontal section through the heating chamber;

FIG. 1d is a section on line C-D of FIG. 1c;

FIG. 2 is a diagrammatic horizontal section through the heater element;

FIG. 3a is a diagrammatic view of the front face and FIG. 3b is a diagrammatic view of the back face of the heater element plate showing the electrical components placed on each of said faces, in case of a temperature probe fixed to the plate;

MORE DETAILED DESCRIPTION

Figure 4:
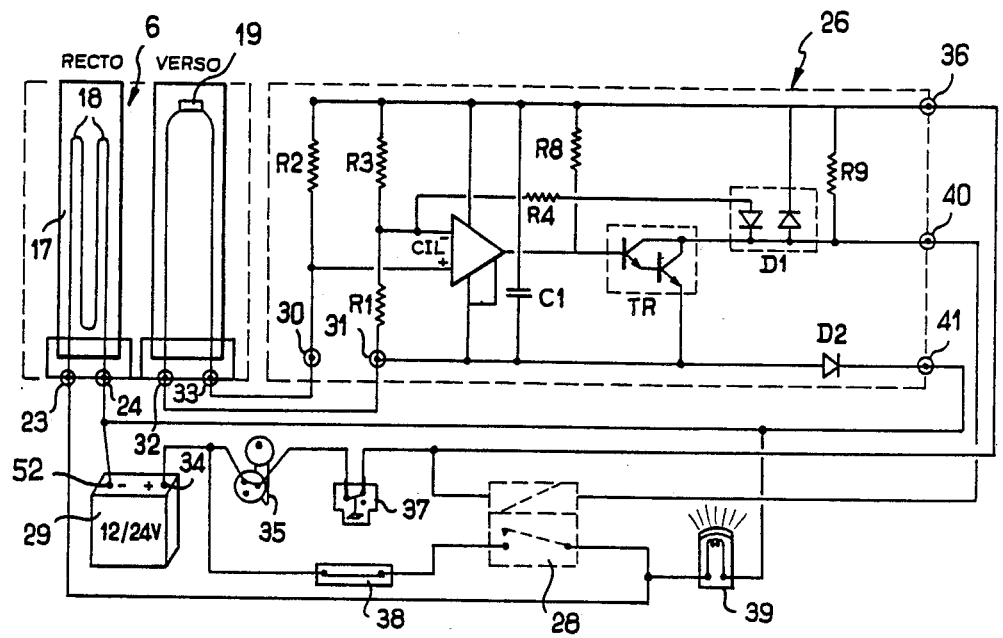
FIG. 4 is an overall electrical circuit diagram of the apparatus.

FIGS. 1a, 1b, 1c, and 1d are diagrammatic section views of a heating chamber in the version in which the heater body is situated at the inlet to the filter or pre-filter (not shown). A body 1 is made of light alloy so that the fatigue forces due to vibration do not require the presence of a fixing system for fixing it to the rigid elements of other mechanical parts of the vehicle. This body is generally formed in a rod of light alloy having a square cross-section with a side of 30 mm. Openings 3 and 4 are drilled and tapped with different dimensions depending on the diameters of the inlet openings to the pre-filter or to the filter at an end 2 of the body 1, and diesel fuel (or light oil) enters and leaves the heating body via said openings. In theory, sealing is provided at the opening 3 by means of a sealing ring shaped to match the connector used, and the tapping in the opening 4 is performed so that sealing is provided by an aluminum gasket and a corresponding countersink. The other end 5 of the body 1 is drilled to receive the heater element 6 (shown in FIG. 2). A plug 7 closes said end 5. The plug is made of material which is not damaged by the fuel, for example a plastic material such as a 6,6 polyamide impregnated with 25% glass, and it is molded into place on an end 21 (see FIGS. 3a and 3b) of a plate 17 forming part of the heater element, with said plug extending over about 10 millimeters at the end of the plate including the connections of the electrical conductors 23, 24, 32, and 33 with the heater element 6, whose end 21 is thus enclosed in and fixed to the plug 7. The plug 7 of the heater element is sealed by means of a peripheral sealing ring 8 received in a groove 9 around the plug 7. A spring clip 10 is received in a groove 11 formed in the end 5 of the body and serves to hold the heater element inside the body, but any other conventional means could be used to retain the plug 7 in place, for example it could be held by a lock nut. In order to position the heater element 6 correctly so as to ensure proper flow of diesel fuel or of light oil, as required by the invention, a key 12 on the plug 7 is received in a notch 13 machined in the body 1 (or vice versa). The body 1 is of reduced diameter over a length 14 in order to ensure that the fuel follows an approximately U-shaped path. This is also shown in sections AB and CD, and the machining tolerances inside the heating body are established to ensure that this is so. The heater element 6 ends about 1 mm from the inside surface 15 of the body 1. The flow of diesel fuel or light oil is thus constrained to run along both faces of the heater element passing from one side to the other via the recess 16 provided in the body 1. Unreferenced arrows in the figures show the direction of flow.

Liquefiers including heating chambers of larger size and resistances of larger dimensions and greater power could be provided for engines or installations of greater power. It is also possible to put a plurality of heating chambers in series or in parallel, depending on circumstances, with each of said chambers including heater members and monitoring members similar to those described herein.

FIG. 2 shows a heater element 6. In addition to the fixing plug 7 described above, the heater element comprises a rigid plate 17, e.g. of alumina or of epoxy resin, having a mixture of palladium-silver constituting the resistance per se 18 silk-screened on one side only. On the other side of the plate, at its end which does not include a heater circuit, there is a temperature probe 19, and it has two conductors 32 and 33, likewise silk-screened onto the plate, supposing that the probe is capable of being fixed on the plate while still measuring the temperature of the fuel rather than the temperature of the plate. More generally, the temperature probe may be fixed on an independent support mounted on the plug 7.

FIGS. 3a and 3b show the plate 17 together with its various component parts. The particular shape of the silk-screen heater element 18 is a design choice. In the present example (see FIG. 3a) it is in the form of two Us which do not reach all the way to the end 20 of the plate furthest from the plug so as to leave room for various different solutions concerning inlet and outlet arrangements for diesel fuel or light oil. Preferably, the heater element is deposited on one side only for reasons of cost and to facilitate disposing the temperature probe 19 on the other face (see FIG. 3b). The end 21 of the plate has two broad deposits 22 enabling electrical feed wires (23 and 24) to be bonded thereto. The temperature probe 19 is a thermistor and its resistance varies as a function of temperature. It is used as one of the branches of a Wheatstone bridge, and the regulation circuit as a whole is described below with reference to FIG. 5. For reasons of cost, the present circuit uses a sensor whose temperature coefficient is negative, having a resistance of approximately 47 kohms at 25° C., 8 kohms at 65° C. and 6.8 kohms at 70° C. It may be observed that such non-linearity is not a drawback in the present application.

The assembly constituting the heater circuit 18 and temperature probe 19 is, for example, vitrified on the front and back surfaces over the length 27 which constitutes the active portion plus a portion received in the plug 7. This provides good electrical isolation between the electrical circuits and the diesel fuel or light oil. The heater circuit 18 is connected to a relay 28 (see FIG. 4) by the conductor 23 and to the negative terminal 52 of a battery 29 (see FIG. 4) by the conductor 24. The temperature probe 19 is connected to the terminals 30 and 31 of a Wheatstone bridge in the temperature regulating printed circuit 26 (see FIG. 4) by the conductors 32 and 33.

FIG. 4 is an overall electrical circuit diagram of the apparatus. In addition to the temperature-regulating printed circuit 26 which is shown in greater detail in FIG. 5 and is therefore described below, the circuit of FIG. 4 shows a battery 29 whose positive terminal 34 is connected to the excitation circuit of the relay 28 and to a terminal 36 which is connected in turn to the terminal 33 of the heater element 6, via the "ignition" key switch 35 of the vehicle or of the installation and via an external temperature probe 37 whose electrical contact closes when the temperature drops to around 5° C. and re-opens when the temperature rises to around 10° C. This hysteresis is essential in order to prevent the system from stopping too soon if the outside temperature should rise rapidly while the diesel fuel or light oil remains frozen in the tank. This external temperature probe may alternatively be inserted in a duct conveying the diesel fuel or light oil and located upstream from the heater element. The positive terminal 34 of the battery also supplies the input terminal 23 of the heater element 6 via a fuse 38 and the power circuit of the relay 28, together with an indicator lamp 39 and a terminal 40 of the temperature-regulating circuit 26. The negative terminal 52 of the battery 29 is connected to the return terminal 24 of the heater element 6, to the return terminal of the indicator lamp 39, and to a terminal 41 of the temperature-regulating circuit 26.

Figure 5:
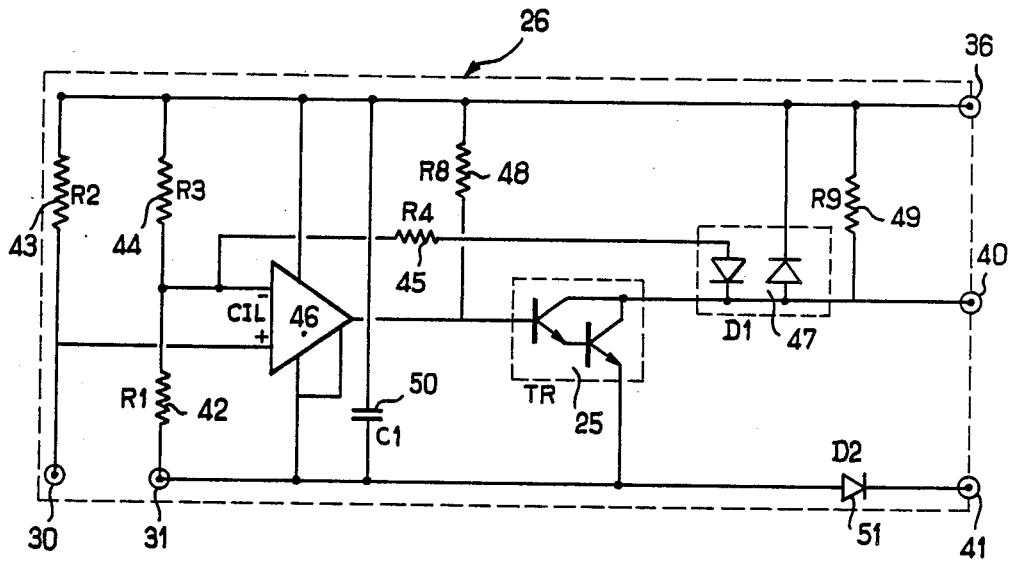
FIG. 5 is a circuit diagram of the printed circuit used for temperature regulation.

FIG. 5 is a detailed circuit diagram of the temperature-regulating printed circuit 26. This circuit is located either outside the heater element 6 or else is applied to the reverse face thereof, or else is integrated in the molded plug 7, and the small amount of heat generated by this secondary circuit cannot be considered as contributing an active part in reheating the diesel fuel or the light oil, particularly in versions having the temperature probe 19 embedded therein. This temperature-regulating circuit 26 comprises various electronic components operating at low current, at currents in the range 100 to 200 milliamps. The temperature threshold detecting circuit relies on the use of a Wheatstone bridge followed by an analog comparator, with a change in the state of the comparator occuring at bridge equilibrium. The hysteresis effect which is essential for proper operation of the apparatus is obtained by the presence of a resistance in parallel with one of the branches of the bridge. This resistance (R4-45) ensures hysteresis between the switch-off and the switch-on temperatures, which hysteresis is necessary to prevent the electrical circuits from hunting and thus to reduce the frequency at which current transients occur. In addition, and this is important in the context of the present invention, such a circuit ensures that regulation is insensitive to the supply voltage to the Wheatstone bridge, which may be from a 12V or a 24V battery or from a 14.3V or a 28V alternator. The Wheatstone bridge comprises three identical resistors of resistance R, namely resistors R1-42, R2-43, and R3-44, where the resistance R is substantially equal to the resistance of the temperature probe 19 at 65° C. (supposing that 65° C. is set as the maximum temperature value for diesel fuel or light oil in this temperature-regulating system). If some other reference temperature, e.g. 40° C., were to be chosen, then the resistance R would need to have a different value, but otherwise the circuit would be identical. The resistance chosen for the resistors in the Wheatstone bridge sets the cut-off temperature of the heater element. Resistor R4-45 has a resistance of 4R. R must lie in the range 5 Kohms to 10 Kohms, which determines which negative temperature coefficient temperature probes are appropriate for use as the temperature probe 19.

A linear circuit CIL-46 in an integrated circuit package (rather than a differential amplifier having discrete transistors) is used as a comparator. Present embodiments make use of a SOIC comparator obtainable from Motorola.

The relay 28 is controlled by an integrated Darlington pair of transistors TR-25 comprising a first, low power bipolar transistor in a common emitter circuit and operated in saturated mode, and a second transistor serving to saturate the first transistor. Instead of using a Darlington pair of transistors, MOSFET (metal oxide silicon field effect transistor) technology could be used.

The base current is equal to one-tenth of the collector current. Resistors R8-48 and R9-49 have resistances lying in the range 5 Kohms to 10 Kohms. Resistor R9-49 is connected in parallel with the relay coil and serves solely to verify that the system is operating properly when the relay is disconnected. Resistor R8-48 feeds base current to the transistor 25 when the output from the comparator is in the high state.

In order to ensure that the system operates reliably in spite of transient voltage spikes and surge currents, a set of two diodes D1-47 is connected in parallel in the circuit. Further, in order to ensure that the comparator 46 does not oscillate, a capacitor C1-50 is inserted in the circuit as close as possible to the output from the comparator 46. If the capacitor C1-50 is too far away, it has no effect. A diode D2-51 is inserted to protect the printed circuit against misconnection. It is connected in series between the monitoring circuit and the grounding terminal of the heater resistance. The temperature regulating circuit may include other transistorized devices in order to increase its reliability and/or its accuracy. The resistor R4-45 for reducing the frequency at which surge currents occur as mentioned above ensures that the heater electrical circuit and the temperature-regulating electrical circuit have a normal lifetime, and in particular that the following circuits have normal lifetimes: the relay 28 feeding the heater element 6, the transistors 25 controlling said relay, the heater resistance 18, the diodes 47 provided for reducing unwanted effects of said surge currents, and the diode 51 provided for protecting the printed circuit against mis-connection.

The electric circuit is such that the power feed (to the heater resistance) takes place via two independent wires (connections 23 and 24) neither of which need be connected to ground, and likewise the power supply to the low power control circuit is also provided by two other independent wires (connections 36 and 41) neither of which need be connected to ground.

I claim:

1. A method of liquefying fuels containing paraffins when, under the effect of cold temperatures, said paraffins obstruct the filter element of the filter (and also of the pre-filter if one exists) located in the feed circuit of a compression ignition engine or of a heating installation, there being a pump situated downstream from the filter to draw-in fuel from a tank, the method including the step of placing a heat source in a heating chamber located upstream from and close to said filter element with the fuel passing through said heating chamber, the method including the improvement whereby the heating chamber is chosen to be of small volume compared with the volume of the filter or the pre-filter and said heat source is regulated to a temperature of about 70° C., thereby initially injecting a small number of cubic centimeters of fuel contained in the heating chamber heated to about 70° C. into the filter element when the pump starts during the start-up operation of engine, and subsequently during normal operation of engine, injecting into the filter element very hot streamlines of fuel included within a flow having an average temperature which remains less than 40° C. even though some of said streamlines are at a temperature close to 70° C., said heat source having a large contact area with the fuel, said area being electrically insulated for safety reasons and having a uniform temperature, and the flow of fuel through the heating chamber when the pump is in operation being directed around the heat source in such a manner as to ensure a long period of contact and a high degree of heat exchange between the heat source and the fuel, with turbulent flow being set up in the fuel, thereby setting up instantaneous temperature differences within the volume of its flow and as a function of time, thus providing intermittent streamlines or jets of fuel at the outlet from the heating chamber at temperature close to the surface temperature of the heat source wherein the flow of fuels is directed along a substantially U-shaped path around the heat source within the heating chamber.

2. Apparatus for liquefying fuels containing paraffins when, under the effect of cold temperatures, said paraffins obstruct the filter element of the filter (and also of the pre-filter if one exists) located in the feed circuit of a compression ignition engine or of a heating installation, there being a pump situated downstream from the filter to draw-in fuel from a tank, the apparatus comprising a heating chamber including a heat source, said chamber being suitable for having the fuel pass therethrough and being disposed upstream from and in the vicinity of the filter element of the filter (and of the pre-filter if one exists) located in the feed circuit of said engine or of said heating installation, the apparatus including the improvements whereby the heating chamber is of small volume relative to the volume of the filter (or of the pre-filter), wherein the inside shape of the heating chamber and the position of the heat source therein are such that the fuel follows an approximately U-shaped path around the heat source inside the heating chamber, whereby the heat source is constituted by at least one electrical heater resistance in the form of an extra flat circuit on a rigid support plate, whereby temperature-regulating means are associated with the heat source to prevent the temperature of the fuel from rising to more than about 70° C., and wherein the heat source is protected from direct contact with the fuel by an electrically-insulating coating.

3. Apparatus according to claim 2, wherein the electrical heater resistance is shaped so as to present a long developed length, thereby enabling a suitable quantity of electrical power to be dissipated per square centimeter of the area of the support plate in contact with the fuel.

4. Apparatus according to claim 2, wherein the electrical heater resistance is in the form of an elongate W-shape with rounded corners.

5. Apparatus according to claim 2, wherein the electrical heater resistance is formed by an extra flat metal deposit on a support of electrically-insulating material.

6. Apparatus according to claim 2, wherein the electrical heater resistance and its support plate are designed so that the power dissipated by the heat source is not more than about 10 watts/cm$^2$ for each face, so that the surface temperature of the heat source does not exceed about 70° C. in a normal fuel flow.

7. Apparatus according to claim 2, wherein the heating chamber is located immediately upstream from the filter and/or the pre-filter.

8. Apparatus according to claim 2, wherein the heating chamber forms a portion of the fuel inlet circuit to the head of the filter.

9. Apparatus according to claim 2, wherein the heating chamber has an open end for receiving the heat source, wherein said open end is closed by a plug of material which is not damaged by the fuel, with one end of the heat source being received in said plug, and with electrical conductors connected to said heat source being bonded thereto within said plug, means being provided to ensure that the plug closes the opening in which it is received in sealed manner, and key means also being provided on the side wall of the plug and on the inside wall of the heating chamber in order to ensure that the heat source is positioned in the proper plane inside the heating chamber.

10. Apparatus according to claim 2, wherein said temperature-regulating means comprise an electric circuit including a temperature sensor placed at such a distance from the heater resistance as to be relatively insensitive thereto and immersed in the fuel close to the outlet thereof from the heating chamber in order to measure the outlet temperature of the fuel.

11. Apparatus according to claim 10, wherein said electric circuit comprises a Wheatstone bridge followed by an analog comparator for detecting temperature thresholds, said temperature sensor constituting one of the branches of the Wheatstone bridge.

12. Apparatus according to claim 11, wherein the resistances of the resistors in the wheatstone bridge are chosen to determine the cut-off temperature of the heater element.

13. Apparatus according to claim 10, wherein the electric temperature-regulating circuit is a printed circuit.

14. Apparatus according to claim 10, wherein the temperature sensor is a semi-conductor operating at low current and whose resistance varies as a function of temperature.

15. Apparatus according to claim 11, wherein the Wheatstone bridge includes an additional resistance disposed in parallel with one of its branches, said additional resistance providing hysteresis between the switch-off temperature and the switch-on temperature, said hysteresis serving to prevent hunting phenomena in the electrical circuits of the apparatus.

16. Apparatus according to claim 10, wherein suitable electrical components are inserted in the temperature-regulating circuit in order to increase reliability in the event of mis-connections or of transient currents.

17. Apparatus according to claim 2, wherein the heating chamber is associated with other, similar heating chambers installed in series or in parallel with the first heating chamber and provided with similar members for heating and for temperature control.

18. Apparatus according to claim 2, wherein the electrical heater resistance is an extra flat metal deposit covered by an electrically-insulating coating, and wherein the support plate is made of a material which does not conduct electricity.

19. Apparatus according to claim 18, wherein the electrical heater resistance is formed by a deposit of palladium-silver or of platinum-silver, wherein the support plate is made of alumina or of epoxy resin, and wherein the insulating coating on the electrical resistance is a deposit of glass.

20. Apparatus according to claim 10, wherein the electrical circuit is such that the feed to the heater resistance and the connection to the temperature-regulating circuit thereof are each provided by a corresponding pair of two independent electric wires, thereby ensuring that neither wire in either pair need necessarily be connected to ground.

21. Apparatus according to claim 2, wherein the heating chamber is located between the head of the filter and/or the pre-filter and its filter element.

* * * * *